Figure 1:
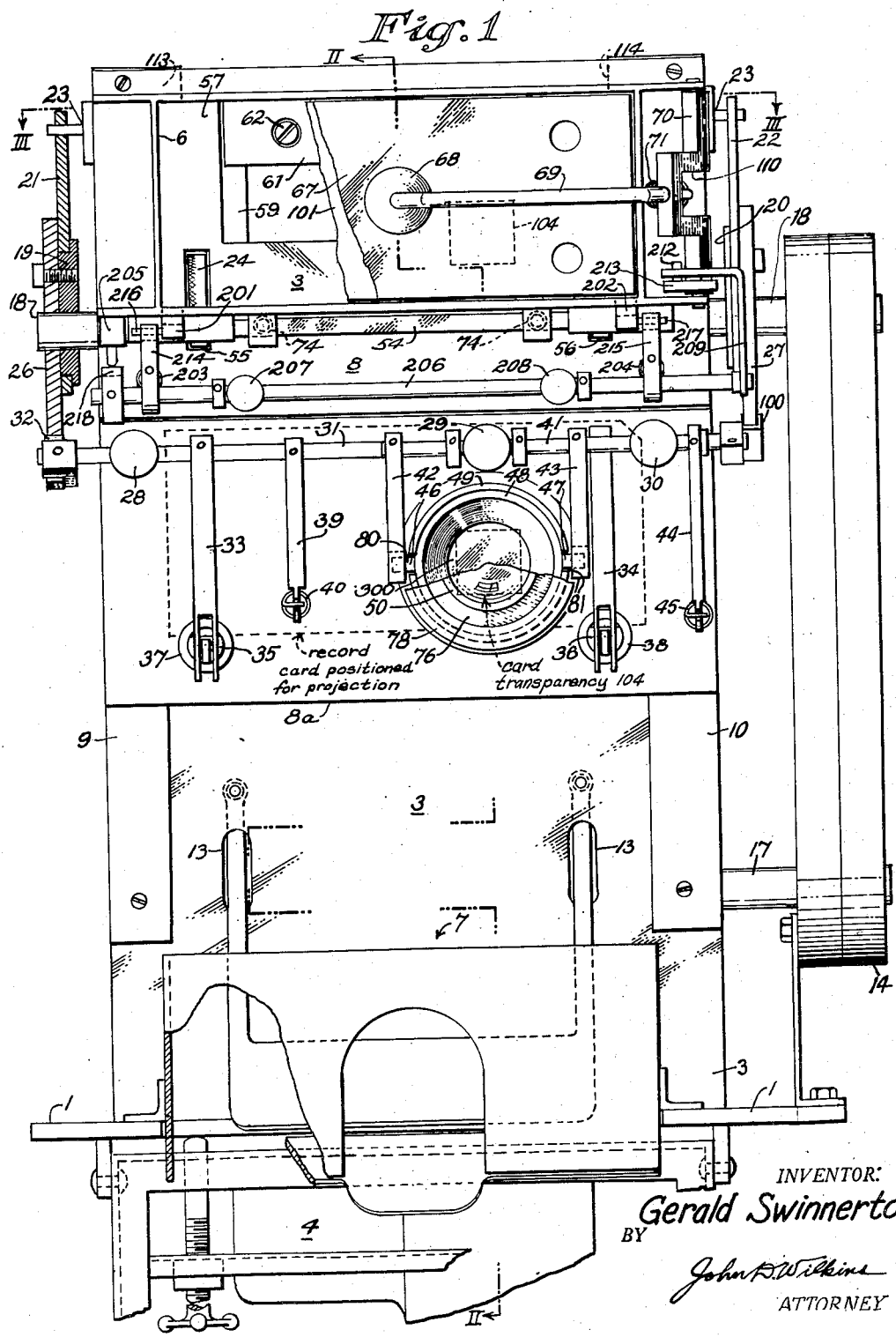

April 7, 1959  G. SWINNERTON  2,880,647
MAGAZINE TYPE RECORD CARD PROJECTOR
Filed March 2, 1956  7 Sheets-Sheet 2

INVENTOR:
Gerald Swinnerton
BY
John D. Wilkins
ATTORNEY

April 7, 1959 G. SWINNERTON 2,880,647
MAGAZINE TYPE RECORD CARD PROJECTOR
Filed March 2, 1956 7 Sheets-Sheet 3
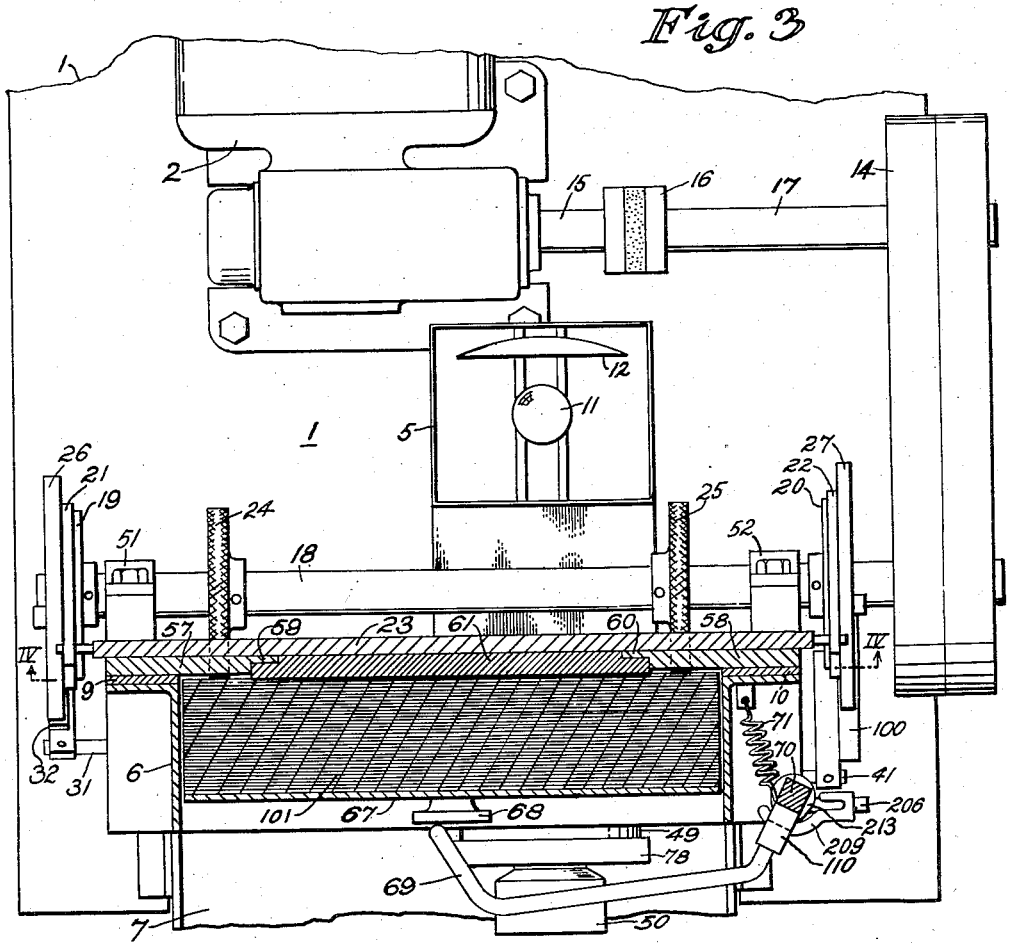
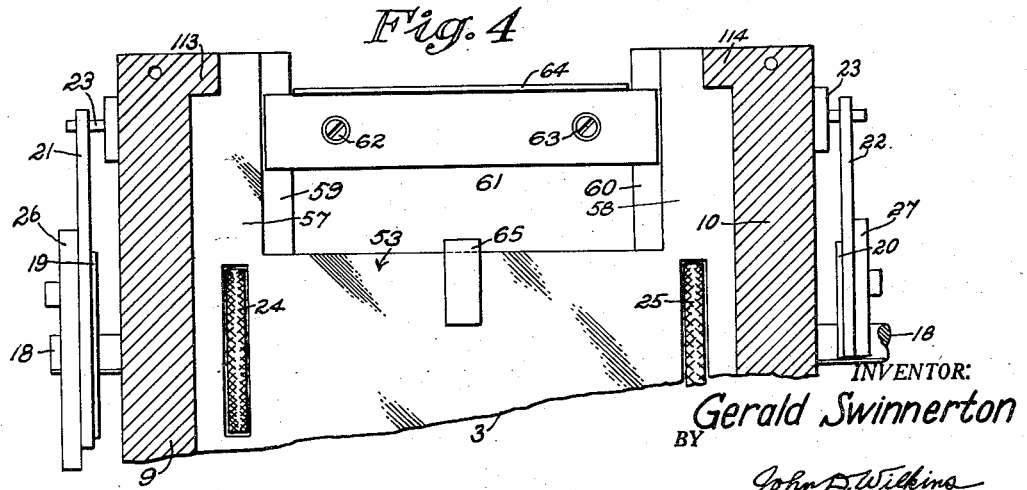
INVENTOR:
Gerald Swinnerton
BY
John D. Wilkins
ATTORNEY INVENTOR:
Gerald Swinnerton
BY
John D. Wilkins
ATTORNEY April 7, 1959     G. SWINNERTON     2,880,647
MAGAZINE TYPE RECORD CARD PROJECTOR
Filed March 2, 1956     7 Sheets-Sheet 5

INVENTOR:
Gerald Swinnerton
BY
ATTORNEY

April 7, 1959 G. SWINNERTON 2,880,647
MAGAZINE TYPE RECORD CARD PROJECTOR
Filed March 2, 1956 7 Sheets-Sheet 6

INVENTOR:
Gerald Swinnerton
BY
John T. Wilkins
ATTORNEY

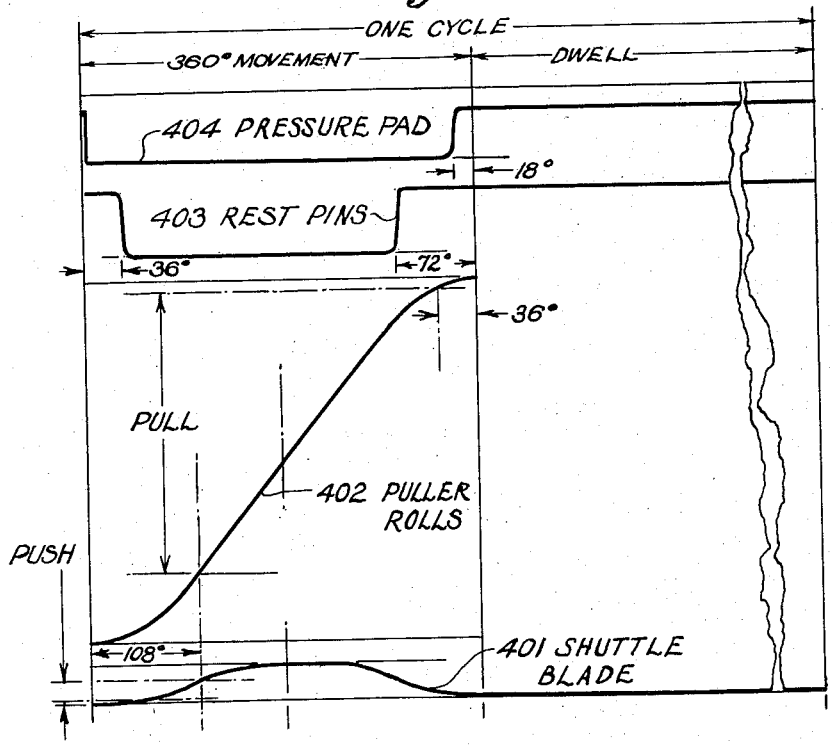
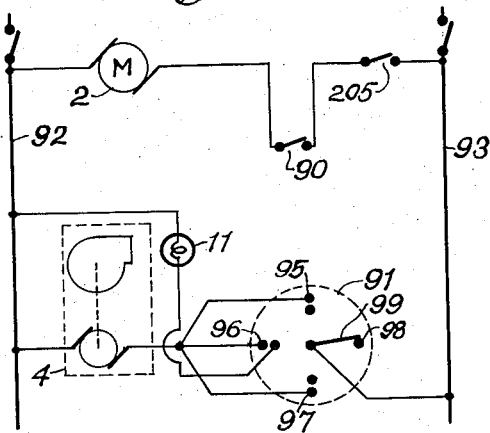

2,880,647

MAGAZINE TYPE RECORD CARD PROJECTOR

Gerald Swinnerton, University City, Mo., assignor to Supreme Photo Products, Inc., a corporation of Missouri Application March 2, 1956, Serial No. 569,118

19 Claims. (Cl. 88—28)

This invention relates to image projection and more specifically to apparatus and its method of operation for projecting enlarged images of a transparency or the like upon a screen where the image may be viewed and studied for a time.

The invention is particularly directed to projection in sequence of a series of microfilm photographic transparencies mounted in "windows" of information carrying or identification record cards of the punched or selectable type. Microphotographic transparencies of portraits, letters, documents such as patents, literature items and the like may be mounted upon record cards upon which a great number of informational matter or data regarding the subject matter of the card is recorded. Cards of this type are further provided with differentially placed perforations representing the particular combination of distinguishing facts pertaining to the card subject. Such cards may be of the type punched peripherally for selective engagement with selector rods or they may be punched for selective electroconductive actuation of a punch card selector machine wherein data is sensed electrically by brushes completing circuits through the perforations. While such machines make a preliminary selection of a series of record cards on the basis of certain general informational criteria, it is often necessary that a final identification of the particular subject or a more narrow selection of pertinent cards on the basis of more specific characteristics must be made by the searcher or viewer himself. For example in police detection work, punch cards are set up for each of many persons with criminal records so that each card bears a transparency of a front and side view of the head of one such person and also bears a group of perforations indicative of the sex, age, build, heighth, color of hair, eyes and complexion, speech, dental statistics and other identifying characteristics of the person of the police record card index. From general observations made regarding an assailant or burglar, by observers, bystanders or the victim, for example, an entire large lot of cards of a police index may be passed through a punch card selector machine which segregates from the whole lot a relatively small series of cards of likely suspects. It is desirable then the pictures of this small group of suspects be projected on a screen for the purpose of enabling witnesses to identify the specific criminal from the select group.

Heretofore projection of the images borne on the cards selected has been done manually with conventional slide projection apparatus. In the course of handling of the series of cards, invariably they become frayed, scuffed and otherwise mutilated and are eventually rendered by such cumulative mutilation unfit for further handling with the whole lot of cards. Especially with punch cards of the electrically detectable type, it is important that the cards remain free from mutilation so that the detection apparatus can handle all the cards dependably without failure. Furthermore, passage of such cards at randomly varying intervals of exposure on the screen is undesirable in that by long exposure images are thereby stressed unduly as compared to those of short exposure. But automatic projection equipment which runs the cards through at an unceasing constant rate is also not desirable because occasionally the viewer such as a witness will request that an image be held for a greater interval for more detailed study or for refreshment of the memory. Still other types of conventional projection equipment have the disadvantage of mutilating the cards in automatic handling.

Figure 2:
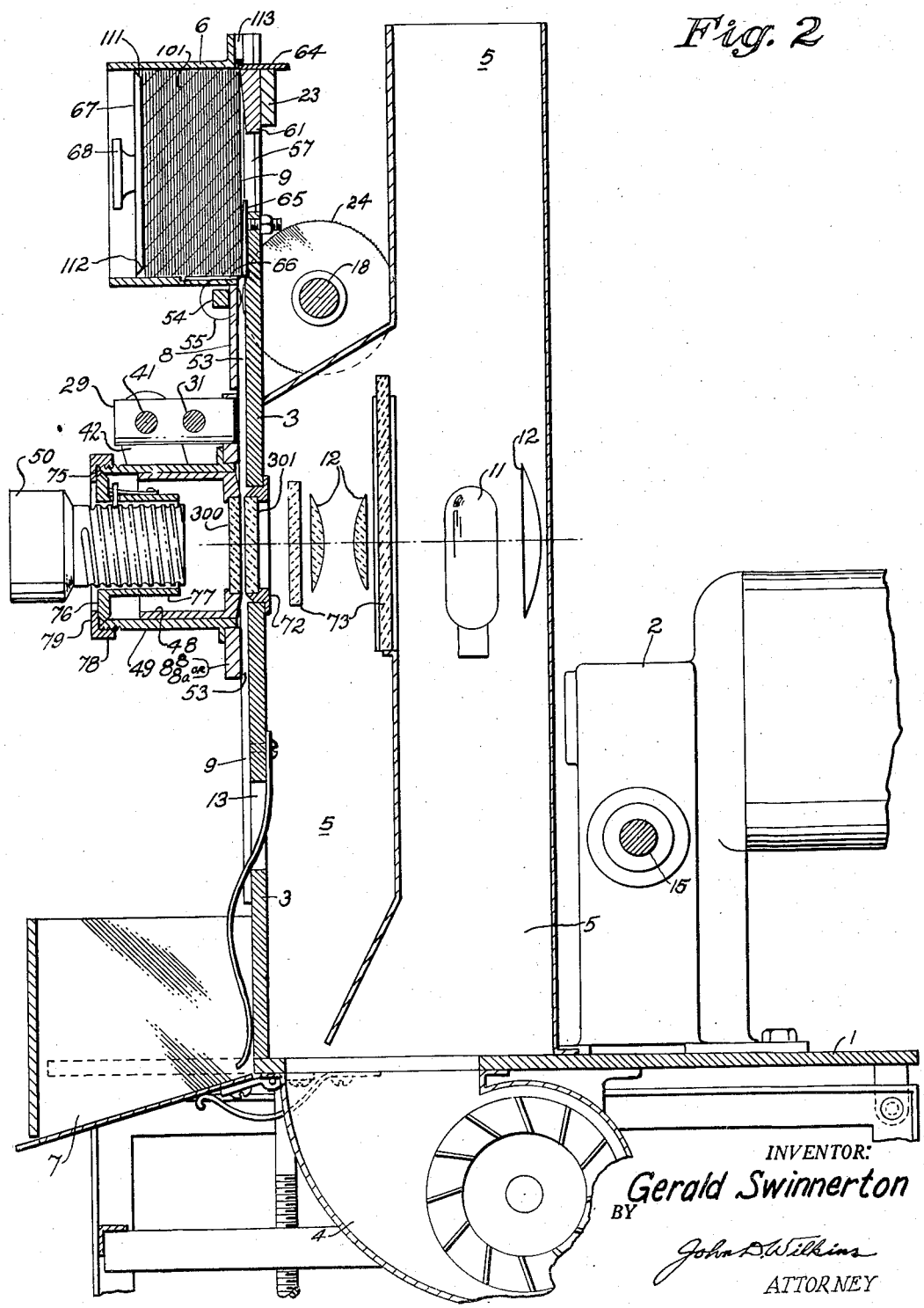
Figure 5:
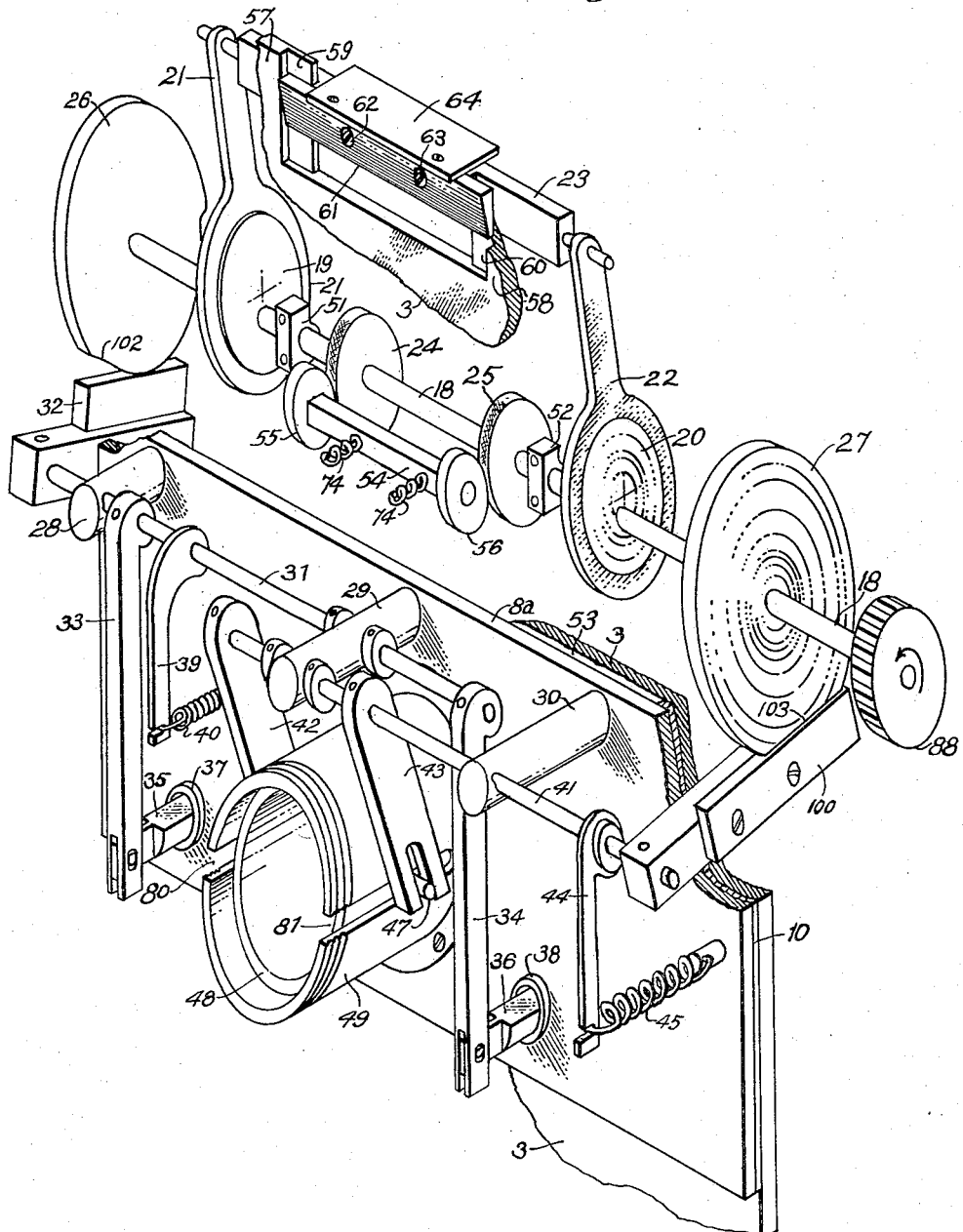
Figure 6:
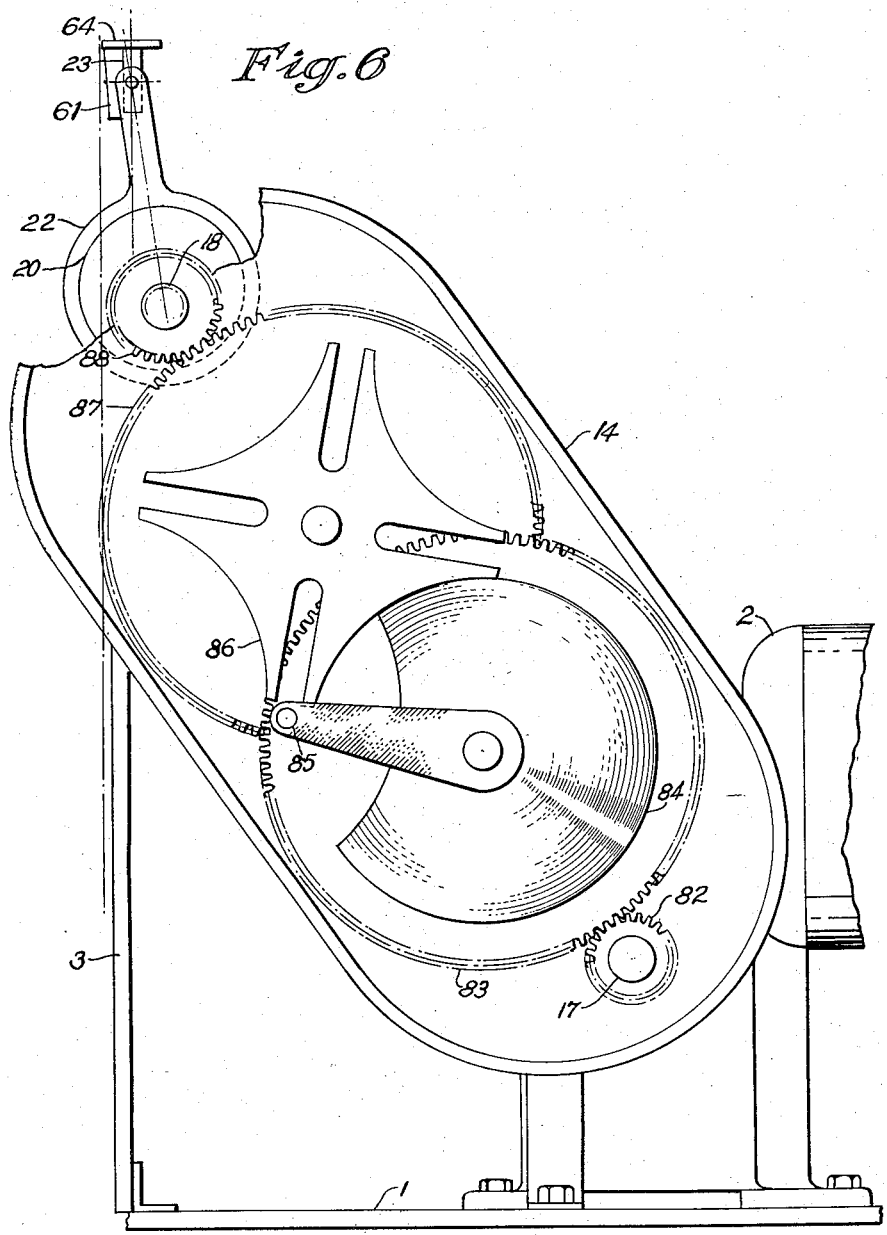
Figure 7:
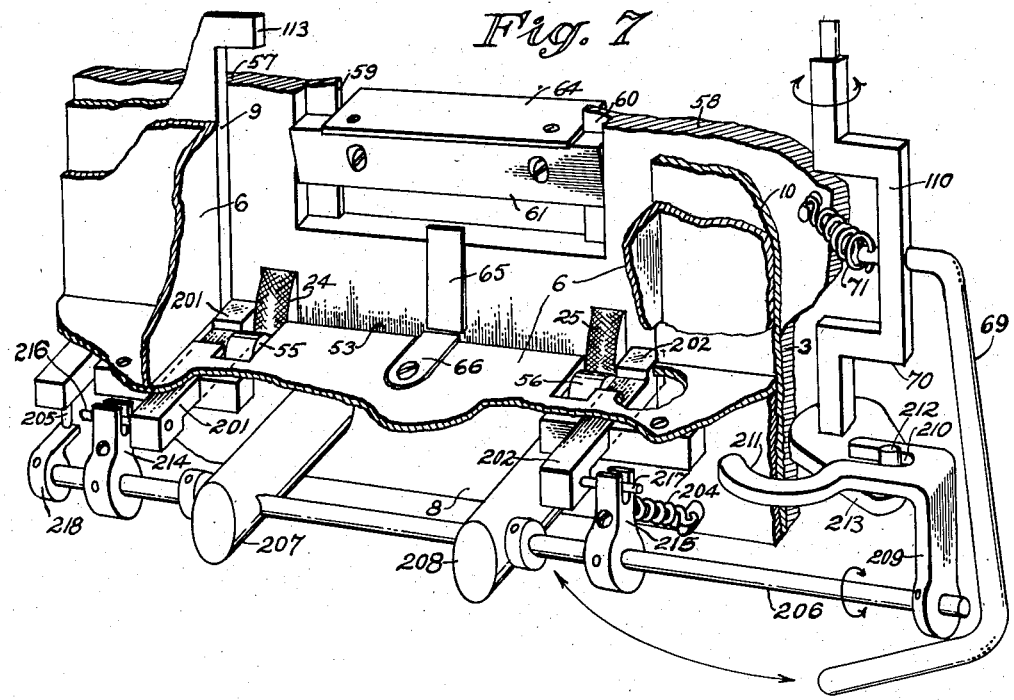
Figure 8:
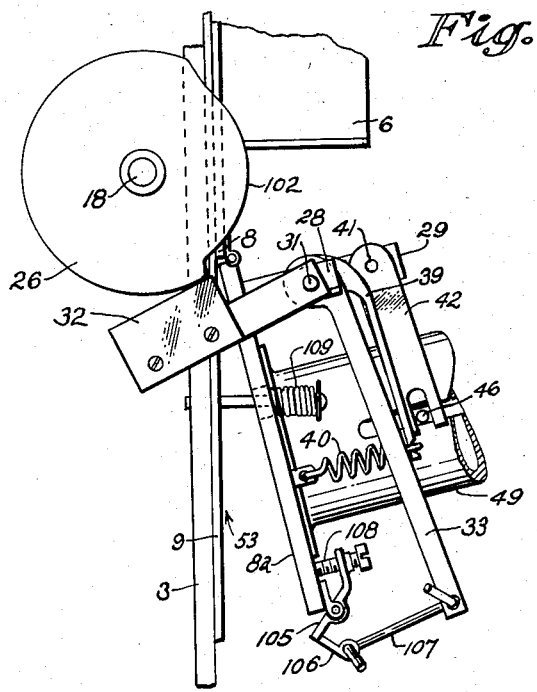

Therefore, a general object of this invention is to provide card handling and projection apparatus free from the above-noted disadvantages. More specifically another object of this invention is to provide an image projection apparatus capable of automatically projecting an entire series of images one-at-a-time on a screen where each projected and suitably enlarged image is held for a time to permit desired identification or study of the subject of the image. Another object is to provide projection apparatus wherein individual image carrying cards are automatically picked up from a stack of cards in a magazine and passed through the apparatus and collected without mutilation of any kind to the cards. Another object is the provision of a sturdy yet compact motor driven projector mechanism characterized by dependable trouble-free operation. Another object is the provision of a record card image projection apparatus, wherein the cards are fed one-at-a-time in sequence, free from any jamming or interference between successive cards. Another object is to not only accurately register a transparency bearing card with the light aperture at the projection station but to also position the transparency with maintained planarity and invariance at the focal plane. Still another object is to provide an automatic projector readily yieldable to variable operation at the operator's will as desired or necessary for a more or less detailed study of the projected image. Other objects and advantages will be apparent from a description in detail and the accompanying drawing in which:

Fig. 1 is an elevational front view of a preferred embodiment of my invention with certain parts broken away and some in cross section; Fig. 2 is a semi-diagrammatic side view taken on line II—II of Figure 1; Fig. 3 is a partial plan view partly in section on line III—III of Figure 1 at the magnazine; Fig. 4 is a view on line IV—IV of Figure 3; Fig. 5 is a semi-diagrammatic perspective view; Fig. 6 is a semi-diagrammatic view of the transmission mechanisms; Fig. 7 is a perspective view of the cut-off gate mechanism; Fig. 8 is a view of an alternative rest pin arrangement; Fig. 9 is a timing diagram; and Fig. 10 is the circuit diagram of the projection device of this invention.

In accordance with this invention there is provided in a projector having a projection lens and lamp system including a projection position, a photo-identification card chute or run for guiding the cards to and away from the projection position of the system, a magazine, and a motor driven card transfer mechanism for automatically feeding cards one-at-a-time to the chute with desired motion. The projector automatically pushes cards from a magazine to the chute with low acceleration, mechanically advances them with substantially no impact to the projection position where the image carrying cards are held for a suitable interval of time while the image is projected on an opaque screen or ground glass viewer after which the card is released or discharged to any suitable card collecting rack or the like.

The projector consists in general terms of a supporting base, a chassis plate along which cards are conveyable, an optical and illumination system, a source of power such as an electric motor, a power transmission of the intermittent motion type, a card magazine, and a card transfer, holding, and discharge mechanism. The intermittent power transmission is a gear train including a Geneva type star-cam and drive pin wheel or the equivalent. At a further point in the mechanism a slider crank motion is superadded. The transmission provides the dwell necessary to projection of the card image for a suitable interval of time. When in full motion the transmission provides not only desirable low acceleration and deceleration but also cooperates with slider crank motion to provide an extremely low acceleration rate of advantage in the portion of the device that overcomes the inertia and static friction of a card to be fed from the magazine without mutilation.

It has also been found according to this invention that by pushing a card along a substantial portion of an edge at an extremely low acceleration rate to merely initiate movement of the card, and by thereafter continuing movement of the card while only partially peeled from the stack of cards in the magazine by a pulling action which disengages the moving card from the pusher as soon as possible after the inertia and static friction of the motionless card has been overcome, mutilation is largely avoided and life of a projection card of the record type is substantially unimpaired by projection. Furthermore, in the apparatus of this invention the moving card is subjected to a stopping or decelerating force distributed so as to avoid mutilating pressures on the card while it is released to be subsequently put at rest at the projection position. Thus it is within the concept of this invention that card pressure forces and velocity be held to a minimum and that both acceleration and deceleration of the cards occur at moderate pressures. Therefore, in those portions of the device where gravity is relied upon for movement, the path of free fall of the cards is made as short as possible; and in any event impact starts and stops at excessive card pressures are avoided in this automatic projection device.

According to still another feature, both the projector lens and card releasing and arresting mechanism may be mounted together so as to be movable to a card releasing and light arresting position. Preferably this is automatically done between each projection by cooperation with the rest of the actuating mechanism. Alternately it may be done manually whenever needed to remove an unsuitable card.

This invention will be more clearly understood from a description of the specific embodiment illustrated in the drawing where 1 refers to a supporting base, 2 refers to a gear motor mounted on the base 1, 3 refers to a vertical chassis plate mounted on the base 1, 4 refers to a cooling draft blower and motor assembly mounted on the base 1, 5 refers to a cooling draft stack or housing protectively enclosing the illumination and optical system 12, which may include a condenser reflector and lenses together or preferably a reflector alone, 6 refers to a card magazine frame mounted on chassis plate 3, and 7 refers to a card collection rack also mounted on the chassis plate 3 at the discharge end of the chute.

Supporting base 1 may be hingedly mounted along its rear edge on any suitable stand, table, or the like so that it may be given elevational adjustment as desired for vertical positioning of the projected image. In this particular embodiment, chassis plate 3 extends upwardly from base 1 as does the cooling stack and lamp and condenser lens housing 5 mounted on base 1 adjacent the rear side of plate 3. At the front of the plate 3, there is a front plate 8 mounted on plate 3 in spaced parallel relationship with the aid of spacer bars 9 and 10 which together with spaced plates 3 and 8 define a card chute 53 of rectangular cross section. The lower portion of plate 8 is preferably a separate plate 8a. The width of the chute is slightly in excess of that of a card but the spacing of the chute is many times the thickness of a card so as to substantially prevent jamming of an ordinary bowed card in the chute.

Opposite the lens system 12 in the stack or housing 5, both plates 3 and 8 are provided with aligned apertures which define between them a projection position in the chute 53 and through which position and apertures the light rays of the optical system from the lamp or source 11, after collection by the condenser lens assembly 12, may pass toward a projection lens 50 and onward therefrom to a projection screen. At the upper end of the chute 53, there is mounted the four-sided open-ended magazine frame 6 on the front plate 8. In this magazine there is a horizontally extending columnar array of cards stacked each vertically on edge. On the lower end and in front of the chassis plate 3 below chute 53 there is mounted any suitable basket or discharged card collection rack 7 which may be a solid frame or open grid of sheet metal or heavy wires the upper ends of which extend through holes 13 in plate 3 and are mounted on the back of the chassis plate 3. At any potential high pressure strike points the rack may be flat faced with any suitable material and construction. This rack construction and mounting permits cards discharged from the chute 53 to drop to the rack 7 without hindrance and the mutilation which might result if the edges of the cards were to strike mounting screws, ridges and sharply curved hard surfaces or the like. It is to be noted that the cards are collected in the same order as they had in the magazine which is frequently an advantage.

Mounted on plates 3 and 8 is the mechanism for feeding, conveying, holding and charging the photo-identification punch cards from the magazine. The motivating power is transmitted to this mechanism from gear motor 2 by way of a control gear transmission system mounted in a closed gear housing 14 one end of which is also mounted on base 1. Power from motor 2 is continuously applied to the control gear transmission system by way of the motor drive shaft 15, the flexible coupling 16 and the driver or input shaft 17 of the gear housing 14, from which the power is imparted intermittently to the main drive shaft 18 of the mechanism which is journaled in bearings 51 and 52 at the top of chassis plate 3 and extends into housing 14 which derives upper support from the shaft 18.

Mounted on shaft 18 are a number of parts of the image card moving mechanism. Adjacent the ends of main shaft 18 there are carried a pair of eccentrically mounted flanged circular cams 19 and 20, about which there are rotatably mounted the hubs of pitman levers 21 and 22 respectively, to the other ends of which there is pivotally mounted a shuttle operating bar 23 extending between the ends of levers 21 and 22. Mounted on main shaft 18 between eccentric cams 19 and 20 are a pair of card puller rolls 24 and 25 the circumferential faces of which are of a length slightly in excess of the heighth of a card and are roughened moderately in any suitable manner as by knurling or the like so as to be frictionally engageable with the cards. Adjacent the eccentric cams 19 and 20 opposite the flanges thereof, there are fixedly mounted on shaft 18 the disc cams 26 and 27, respectively. Cam 26 is the card rest pin circular control cam having a receding circular peripheral portion at 102; and cam 27 is the pressure pad control cam of circular shape flattened on a side at 103. At the hub, pitman lever 21 is axially constrained on shaft 18 by and between the flange of cam 19 and a face of the cam 26. In like manner pitman lever 22 is constrained axially on shaft 18 by the flange of cam 20 and by the cam 27.

Mounted on the front plate 8 (Figures 1 and 5) are a number of forwardly projecting bearing posts 28, 29 and 30. Preferably, these are mounted on a separate front plate lower portion 8a hingedly mounted on the upper portion and held down by a spring or latch releasable to allow portion 8a and parts mounted thereon to be lifted so that any record card, previously very badly warped when received and therefore likely to jam in the chute when no longer pressed flat in the pack following passage through rolls 24 and 25, may be freed. Preferably, plate 8a is automatically swung up between projections (Figure 8).

In posts 28 and 29 there is journaled a card rest pin operating shaft 31 upon which is mounted a rest pin cam follower 32 adapted to be rocked by cam 26 to motivate shaft 31 which carries a pair of spaced pin operating levers 33 and 34 disposed about and on opposite sides of the optical aperture in plates 3 and 8. Opposite the ends of the levers mounted on the shaft 31, one of the ends of each lever 33 and 34 is linked to card rest pins 35 and 36, respectively, slidably mounted in pin bushings 37 and 38 carried in and passing through front plate 8. The function of pins 35 and 36 is to project into chute 53 and to stop cards at the projection position. While the pins are shown to be of circular cross section with a polished flat surface on top, they may be of rectangular or other section just so long as no rough surface and no sharp or narrow edge is presented to the approaching card. A broad, flat and smooth card-contacting face on the pins is preferred. Accordingly each of pins 35 and 36 may take the form of a wide flat plate or be replaced by a single plate extending across substantially the entire width of the card. Also mounted on pin operating shaft 31 at one end is a rest pin closing spring lever 39 the other end of which is attached to a rest pin closing tension spring 40. This return spring 40, the other end of which is attached to front plate 8a, serves not only to move the pins 35 and 36 into the card chute 53 but also to hold follower 32 against card rest pin control cam 26.

In posts 29 and 30 there is journaled a pressure pad operating shaft 41 upon which there are mounted a pressure pad cam follower 100, spaced pressure pad fork levers 42 and 43, and a pressure pad closing spring lever 44, one end of which is fixed on shaft 41 and the other end of which is attached to pressure pad closing tension spring 45 the opposite end of which attached in turn to front plate 8. The bifurcated ends of levers 42 and 43 engage with pressure pad studs or trunnions 46 and 47 which extend from opposite sides of the tubularly constructed pressure pad 48 which is slidably mounted in telescopic relationship in an extension tube or pressure pad support slide tube 49 which in turn is mounted on front plate 8 to extend forwardly from the front surface of front plate 8. Return spring 45 serves to hold cam follower 100 in engagement with the peripheral profile of disc cam 27 and to urge the pressure pad 48 rearwardly in tube 49 toward the projection position, thereby assuring planarity of the transparent card image held and pressed against the fixed aperture of plate 3 and uniformity and accuracy of its focal position for projection.

Mounted reciprocatably on the front plate 8 opposite puller rolls 24 and 25 is an idler roll shaft 54 on which are carried a pair of card puller idler rolls 55 and 56 which engage yieldably with puller rolls 24 and 25, respectively, under the urge of idler roll compression springs 74 at about the midplane of chute 53.

At the upper end of chassis plate 3 adjacent the outlet end of the magazine frame 6, the plate 3 is provided with an open shuttle window disposed between uprights 57 and 58 integral with plate 3 which in turn are provided with shuttle vertical guide ways or rails 59 and 60, respectively, extending into the shuttle window. The hereinbefore mentioned shuttle operating bar 23 rides along one side of the shuttle ways 59 and 60 in lateral edge recesses in bar 23; and riding on front of these ways is a shuttle plate 61 carried on shuttle bar 23 by means of two screws 62 and 63 or the like at least one of which passes through plate 61 with considerable clearance to permit the shuttle plate 61 and the relatively broad shuttle blade 64 carried on plate 61 to be angularly adjusted together in a vertical plane to put both in horizontal parallelism with the upper horizontal edge of the front end or leading card of the stack in the magazine. Shuttle blade 64 is adjustably mounted on top of shuttle plate 61 so as to extend beyond the upper edge of the card abutting surface of plate 61 by a distance slightly less than the thickness of a single card by any suitable fastening means. To assure card engagement with the blade 64, the face or surface of the plate 61 facing the stack of cards in the magazine 6 is sloped away from the extended edge of the blade 64 so that only the upper edge of plate 61 adjacent blade 64 engages with the entire upper edge portion of the leading card of the stack of cards. At the lower end of the shuttle window at the delivery side of the card puller rolls 24 and 25 there is a card gate or monitor consisting of stationary card back-stop or vertical portion 65 carried on chassis plate 3 and an adjustable horizontal portion 66 carried slidably in bottom wall of the magazine 6. One end of 66 extends toward portion 65. The gate halves 65 and 66 are spaced apart by a distance in excess of the thickness of a single card in the stack by about 0.002 or 0.003 of an inch. This allows the shuttle blade 64 when in operation to push no more than one card at a time into the chute 53.

The end of the rectangular magazine frame 6 opposite the shuttle plate 61 is adapted to be closed after the magazine 6 is loaded with cards or the like by means of a rigid rectangular magazine follower or closure and pressure plate 67 having a flat front card engaging face with card detecting openings and on the back thereof a broad flat faced knob 68 for handling and upon which a card advancing force may be applied to the plate 67 by contact of the centrally located knob 68 with the swinging end of a card advancing bent lever or arm 69 extendable into the magazine and mounted at the other end on the loop or yoke 110 of a toggle or crank shaft 70 mounted pivotally on magazine frame 6 while a toggle spring 71 is connected in tension at its ends to the yoke 110 of shaft 70 and also to magazine frame 6. This construction enables the spring 71 in one position of the toggle yoke to force an end of arm 69 against knob 68; and when the arm 69 is moved back out of the magazine 6 and away from the knob 68, spring 71 holds the arm 69 out by toggle action to permit the magazine 6 to be again loaded with a stack of cards without hindrance from the arm 69. Both the top and bottom inside edges of the plate 67 are beveled as at 111 and 112 to prevent interference between pressure plate 67 and shuttle blade 64 in the absence of any cards in the magazine, no matter whether plate 67 is inserted with either edge 111 or 112 up.

At the upper corners of the rectangular magazine 6 there are mounted a pair of fixed top stops 113 and 114 which extend into the card chute 53 adjacent the lateral edges of the cards and prevent the next card in the array 101 from being frictionally lifted by the shuttle blade 64 during its upward return stroke. Thus unidirectional card feed in sequence is achieved without interference.

At the lower corners of the magazine 6, adjacent chute 53 there is provided a pair of retractable chute cut-off gates 201 and 202 slidably mounted in front plate 8 and yieldably urged into chute 53 by gate return springs 203 and 204 respectively. The function of these cut-off gates 201 and 202 is to prevent jamming of cards at the gate and the card mutilation that would be caused thereby. Such jamming would be likely to occur whenever the card advancing arm 69 is withdrawn from contact with knob 68 of follower plate 67, occasionally permitting a card to drop between the card admitting spaced gate halves 65 and 66 before the shuttle blade 64 has a chance to feed a card in the normal fashion. When it does, a second card would be forced between halves and would be seriously mutilated. However, in this apparatus whenever arm 69 is withdrawn from the magazine, gates 201 and 202 move into the chute to obstruct it and at the same time safety switch 205, in series with motor switch 90, is opened thereby stopping the shuttle blade 64. Thus no more cards are fed and there is no danger that the operator's fingers might be injured by a reciprocating blade 64 in attempting to refill the magazine 6.

To accomplish the above, there is provided a gate shaft 206 pivotally mounted by bearing posts 207 and 208 upon front plate 8, a shaft operating gate cam lever 209 one end of which is fixed on shaft 206 while the other is formed with an open slot 210 parallel to shaft 206 and an arcuate extension 211 of one side of the slot. Extension 211 and slot 210 are cam surfaces for the gate cam lever operating pin or follower 212 mounted in one end of crank arm 213 to move over part of a circle. The other end of arm 213 is mounted fast on toggle crank shaft 70 to turn with it. Also mounted fast on gate shaft 206 are a pair of gate levers 214 and 215 the swingable ends of which are slotted radially to take the linking pins 216 and 217 each carried on one end of cut-off gates 201 and 202, respectively. Also mounted on shaft 206 is a safety switch operating lever 218 which at an end of travel of its free end opens the normally closed safety switch 205.

With return springs 203 and 204 holding arcuate cam surface 211 always against follower pin 212, toggle shaft 70, with its crank arm 213 extending generally perpendicular to shaft 206, in the portion of turning corresponding to the end of card advancing arm 69 being in contact with knob 68, the gates 201 and 202 remain retracted from the card chute 53. This is because the curvature of arcuate cam 211 is complementary to that of the path of pin 212. But as soon as the end of arm 69 is withdrawn sufficiently out of the magazine 6, crank 213 turns in the portion of its travel which is more nearly perpendicular to shaft 206 and pin 212 operates in straight slot 210 to turn lever 209 and thereby rotate shaft 206 to put the gates 201 and 202 either into chute 53 or out of it quickly. At this portion of operation, safety switch 205 is either quickly opened simultaneously with movement of the cut-off gates into the card chute, or it is closed simultaneously with movement of the gates out of the chute. Thus card feed is either entirely halted or is permitted to go on freely.

It will be understood that the foregoing safety and card chute cut-off may be accomplished by other mechanical or electrical elements. For example, instead of crank 213, toggle shaft 70 may have a drive wheel with a serrated rim; and gate shaft 206 may have, instead of gate cam lever 209, a driven gear wheel one face of which, adjacent the aforementioned wheel, is serrated to enable meshing between the wheels at such ratio as to either immediately put the gates into the chute at the slightest withdrawal of the card advancing arm 69 or pull the gates back upon advance of this arm into the magazine. To prevent locking and to allow slippage, the driven wheel is splined upon shaft 206 and yieldably urged against the drive wheel by means of a coil compression spring coaxially mounted on shaft 26. Still another equivalent safety mechanism will include a solenoid thruster for each of the gates 201 and 202 and controlled by a pressure sensitive contactor mounted in the end of the card advancing arm 69. This contact will also serve to actuate a safety switch equivalent to switch 205.

At the fixed aperture in chassis plate 3 and aligned along the optical axis together with light source 11 and any suitable reflector or condenser lens assembly 12, is an aperture ring 72 the front of which is slightly beveled all around so as to have a slight convexity protruding into the card chute 53. The opening in ring 72 is closed with a flat glass platen 301. On the other side of ring 72 adjacent optical system 12 there may be mounted one heat filter glass 73 or a number of such spaced apart.

Opposite ring 72, there is mounted in front plate 8 at its projection aperture the partially bifurcated extension tube 49, which projects forwardly away from the card chute 53. This tube has at one end a pair of diametrically opposed slots 80 and 81. The other end of extension tube 49 is supported around the aperture of plate 8. The slotted end is externally threaded and internally beveled at 75 for self-centering engagement with the beveled flange 76 of a lens mount tube 77 when the mount retainer 78 is screwed on the threaded end of tube 49 until the internal flange 79 of ring 78 presses against the flange 76 of tube 77. This tube is provided with the holding and focus adjustment thread of the projection lens 50 in tube 77 in alignment with the optical system.

One end of pad 48 is the moving aperture at plate 8 and contains a flat glass platen 300 for pressing the card transparency against the other platen 301. The oppositely extending studs 46 and 47 of pad 48 pass through slots 80 and 81 as tubular pad 48 telescopes back and forth in tube 49. Thus I obtain accurate positioning and also maintenance of flatness of the transparency.

In the control gear housing 14 are located the components by which a holding interval is obtained so that the transparency at the projection position is held for a desired period of time sufficient to permit study of the projected image. The components include a drive pinion 82 mounted on input shaft 17, a first intermediate gear 83 journaled in housing 14 and upon the hub of which is carried a Geneva gear driver wheel 84 carrying a drive pin 85 on a radial extension of driver 84 and having a cut away portion to provide clearance space for passage of the slotted arms of the Geneva driven star-cam 86 having four radially slotted arms, the slots of which are engageable in sequence with the pin 85 each time the driver 84 makes a revolution thus turning the driven cam 86 a quarter of a turn. Between engagements of pin 85 with a slot, the concentric peripheral surface of the driver 84 engages one of the arcuate concave surfaces between each pair of slots and thereby holds the driven cam 86 substantially motionless for an interval during which the card is also held in the projection position in chute 53. Carried on the hub or shaft of driven cam 86 is a second intermediate gear 87 which in turn meshes with main shaft pinion 88 carried on main shaft 18, journaled in bearings 51 and 52 on chassis plate 3. The pinion 88 has a one to four ratio to intermediate gear 87, so that each movement of star-cam 86 results in one turn of main shaft 18 to give one cycle of operation to the automatic mechanism of the projector of this invention. It is to be noted that the velocity characteristics of the Geneva gearing in housing 14 provide desirably low acceleration at the commencement of each intermittent movement and a low deceleration at the end. From the low acceleration, advantage is obtained in various ways but especially at the shuttle blade 64. Here card mutilation is avoided. Advantage is again taken of the period of deceleration at the card puller rolls 24 and 25 at the moment the card is released to pass on to be stopped by the rest pins 35 and 36, to minimize card edge deformation. Another advantage is the reduction of noise throughout the mechanism generally, as at the pressure pad 48. By means of the control gearing of housing 14 I am enabled to obtain gradual, quiet but prompt card movement alternately with a desirably lengthy period of dwell during which the card is being projected for study.

The electric system of the projector (Figure 10) includes the normally continuously operating main motivating power or drive motor 2, the electric motor driven cooling air blower 4, the light source or projector lamp 11, the drive motor control switch 90 and the 4-way illumination system switch 91 which controls the lamp 11 and the blower 4. Motor control switch 90 may be located either on the projector or at a distance connected by an insulated cable or cord extending between the projector and the switch 90 which may be a hand switch operable by the projection machine operator or by a separate viewer or witness. It may include a dual control switch at a distance from the projector and its housing in which event the dual control is in series with its counterpart at the projector. The motor 2 may be of the fixed speed type or may be provided with means to vary its speed. One side of motor 2 is connected to one side 92 of the electric power lines which may be of the conventional 120 volt 60 cycle alternating current type while the other side of the motor 2 is connected to one side of main motor control snap-action switch 90 the other side of which is connected in series through safety switch 205 to the other side 93 of the power lines.

The blower 4 and the lamp 11 are connected to power line 92 while the other side of each is connected to a side of the 4-way illumination switch 91 the other side of which is connected to the other power line 93. Switch 91 has three sets of contacts 95, 96, and 97 and an open circuit position 98 and a manually operable contactor blade 99. The aforementioned other sides of each of the blower 4 and lamp 11 are separate until connected in common at the double contact 96. Thus contactor blade 99 when not in open circuit position 98 may make a closed circuit with contact 95 to initially energize the blower 4 alone, or may next make closed circuit with contact 96 to energize both blower 4 and lamp 11 during normal operation or may make closed circuit with contact 97 to continue to energize the blower 4 for a while after the lamp is shut off. Switch 91 is mounted on the projector housing.

With the magazine frame 6 loaded with a column of cards 101 and the card advancing lever 69 pressing against the plate 67 bearing on the cards, operation of the projector is commenced by switch 91 being first closed via contact 95 to contact 96 at which the blower 4 and the lamp 11 are both energized. To initiate the projection of images of the card transparencies, switch 90 is closed to energize the gear motor 2 which puts the automatic card transfer, holding and discharge mechanism into operation. The power from the normally continuously operating motor 2 is transmitted as described hereinbefore to drive shaft which is set into intermittent motion. From shaft 18, reciprocating movement at intervals is imparted by way of the pitman levers 21 and 22, to the shuttle blade 64 which pushes one card at a time partially from the column 101. At the same time from shaft 18 rotation is directly imparted to the card puller rolls 24 and 25 which grasp the card and complete the disengagement of the pushed card from the column 101 and feed it to the chute 53 where the card is released at the relatively low speed of deceleration for a free fall of short length. Shaft 18 subsequently by means of pin control cam 26 permits the spring 40 to project rest pins 35 and 36 into the chute 53 to intercept the falling card at the projection position between the apertures in plates 3 and 8. Next shaft 18, while still in motion and acting through pad control cam 27, permits the spring 45 to close the pressure pad 48 so as to clamp the card between the pad 48 and the aperture ring 72. When this portion of the cycle is reached, drive shaft 18 ceases movement for a time and the image of the card transparency is projected for a desirably long interval of time after which the cycle of motion of shaft 18 begins again. At the commencement of the cycle, shaft 18 acting through cams 27 and 26 respectively withdraws the pressure pad 48 and immediately thereafter the rest pins 35 and 36 thereby releasing the projected card for discharge as another card is started into the chute 53 by the shuttle blade 64.

In the event that the observer indicates exceptional interest in the projected image and desires to prolong his study of it, the operator need merely snap switch 90 open to hold the image. It can be held projected at will as long as desired beyond the normal projection interval after which switch 90 is closed again to resume the cycle of projection.

To take care of an occasional unculled badly bowed card which tends to hang up at the projection position, although released by the rest pins or equivalent rest plate 105 described hereinafter, the projector is preferably provided with either manual or preferably automatic clearing means such as shown in Figure 8. Here the rest plate 105 is coupled to the lower pivotally mounted portion 8a of the front plate to swing it open at the extremity of rest plate or rest pin opening.

A cycle of operation in accordance with this invention may be described at the moment the intermittent movement of the drive mechanism has begun, setting both pressure pad release cam 27 and shuttle blade 64 into action on the cards and the card puller rolls 24 and 25 and rest pin control cam 26 into action but not on the cards as yet. At the beginning of operation pressure pad 48 is disengaged from the card which has just undergone projection; and shortly thereafter the card rest pins 35 and 36 are withdrawn from the card chute 53 thereby releasing the projected card to the discharge outlet of the chute.

Simultaneously, with the leading card of the card array 101 in magazine 6 pressed against the top of shuttle plate 61, shuttle blade 64 is adapted to engage with the major portion of the top edge of the leading card which is to be projected and to begin upon movement of the mechanism to very slowly push the card down from the array 101 into the chute 53. It is to be noted that the shuttle blade 64 works against and overcomes not only the inertia of a motionless card but also its static friction with the next card in the array 101 and that this is done advantageously at extremely low acceleration derived by compounding the low acceleration characteristics of the Geneva cam system in gear housing 14 with the low acceleration characteristics on the low speed side of the slider-crank motion from dead center of the quick return slider-crank mechanism including turning eccentrics 19 and 20, the pitman levers 21 and 22 and the offset reciprocating shuttle bar 23 and its blade 64. The latter two members have a stroke of about half an inch for pushing a card having a heighth of about three and a quarter inches, for example. In somewhat less than this short stroke the pushed card is fed to the bite of the card puller rolls 24 and 25 and the idler pinch rolls 55 and 56, respectively, at which moment the puller rolls are operating at a high peripheral speed relative to the speed of the shuttle blade 64. As a result of the relative velocity between card and blade, the card at this point is pulled out of contact with blade 64 abruptly. But it will be noted that the card is not transferred rapidly by the pinch rolls until after its inertia and static friction have been overcome by the low accelerating, relatively low-speed pusher blade 64. It is to be further noted that of the three and a quarter inches of travel, for example, required to clear a card out of contact with the card array 101, a gradual pushing action is applied for about only half an inch of travel and that the rest and bulk of the card delivery movement is a rapid pulling action both of which together prevent deforming pressure on the card edge and substantially eliminate excessive card buckling or bowing and also any scuffing of the card surfaces from friction with the projector parts such as the card puller rolls 24 and 25 and the shuttle blade 64 as it operates back and forth. The card is not struck with forces large enough to buckle it under its own inertia. Scuffing of the cards is avoided in that the rolls 24 and 25 do not engage with the card until it is put into motion, which eliminates slippage, and because the blade 64 operates over only a minor part of the card heighth. Engagement of the card with the puller rolls, which pulls down the card faster than the broad shuttle blade pushes, is an important factor in preventing damage to the edge of the card during delivery from the magazine.

While engaged by the rolls 24 and 25, the card is advanced into the card chute 53 and released just short of the projection position during decelerating movement of the rolls. Just about the time the card is released from the puller rolls 24 and 25 a part of the receding part 102 of the rest pin control cam 26 arrives opposite the rest pin cam follower 32 enabling rest pin shaft 31 to be turned by spring 40 thereby projecting pins 35 and 36 into the chute 53 to extend across the path of the oncoming card. When the rest pins 35 and 36 are in the chute completely, the card released from the puller rolls drops upon the top surface of the pins which are disposed to stop the card at the projection position opposite the pressure pad slide tube 49. While all the mechanism is still in movement and as the trailing end of the receding or depressed portion 102 of the circular rest pin control cam 26 arrives opposite the rest pin cam follower 32, the flat portion 103 of the pad control cam 27 arrives opposite the pressure pad cam follower 100. The resultant movement of the follower 100 permits the tubular pressure pad 48 to be moved by the pressure pad closing spring 45 toward the card resting upon pins 35 and 36. This movement of the pressure pad 48 causes the card to be clamped about the periphery of the transparency 104, between the flat glass platen window 300 of pad 48 and the flat glass platen window 301 of aperture ring 72 and to be thereby held positively free from buckling or warping in the focal plane ready for projection.

With the card this positioned, the drive shaft 18, and all the mechanism operated by it is put at rest inasmuch as the drive pin 85 of the driver wheel 84 at this point in the operation of the projector has just emerged from a slot of the star-cam 86 and the concentric peripheral portion or surface of the driver wheel 84 engages the arcuate concave surface in cam 86 following adjacent the slot which has just been evacuated by the pin 85. From this point on the card remains at rest at the projection position for a desired interval or dwell such as one of five seconds for example, while the card transparency 104 is projected. During this period the projected image is adapted for study.

At the end of the dwell the succeeding drive movement commences by first pulling back and disengaging the pressure pad 48 from the projected card and immediately thereafter or simultaneously therewith to pull the rest pins 35 and 36 out from under the card and from the chute 53 so as to allow the card to pass on from the projection position to the discharge end of the chute 53. Simultaneously the drive movement activates the shuttle blade 64 to begin delivery of the next card by gentle pushing action from the magazine 6 to the projection position.

In operation when puller rolls 24 and 25 engage with the leading card being pushed out of the magazine by the shuttle blade 64, drive shaft 18 and eccentric cams 19 and 20 have made about a 0.3 of a revolution during which the shuttle blade 64 moves into engagement with a card and pushes it about ⅜ of an inch. This leaves about 0.6 of the periphery of rolls 24 and 25 or about 3¼ inches for a card of three and one quarter of an inch height for drivable engagement with the card which is released from the rolls 24 and 25 about 0.1 of a turn before a complete revolution of shaft 18 is reached. About 72 degrees or the fifth part of a turn before the revolution of rest pin control cam 26 ends, the receding portion 102 of the cam comes into the engagement with follower 32 to allow rest pins 35 and 36 to move into chute 53. About a 0.15 of a turn later the flat side 103 of pressure pad control cam 27 arrives opposite follower 100 to put pressure pad 48 against the card at the projection position. At this point, which is some degrees, such as about 18 degrees, ahead of the end of receding portion 102 of cam 26, shaft 18 has made complete revolution and stops. Consequently when revolution of shaft 18 begins again, flat side 103 of cam 27 disengages from follower 100 instantly and within about 0.1 of a turn later receding portion 102 of cam 26 disengages from follower 32 to release the projected card for discharge.

In the drawing is shown a timing diagram of the various motions involved. Here 401 is a graphical respresentation of the displacement of the shuttle blade 64 and of a card initially as it is picked from the magazine 6, curve 402 represents the peripheral displacement of the puller rolls 24 and 25 and the final feed displacement of the card. The initial low speed acceleration push followed by the high speed pull is evident from curves 401 and 402. Large card displacement is effected by pull as compared to the minor displacement by push. It is to be noted that curve 402 is a Geneva-type motion while curve 401 is a Geneva motion compounded with the low velocity characteristic of the low speed side of the slider motion of a slider-crank mechanism. Curve 403 represents the displacement of the rest pins 35 and 36. Curve 404 shows the displacement of the pressure pad 48. From this entire graphical representation the relationship as well as characteristics of all the motions is evident together with the relationship between movement and the dwell period of the mechanism.

For rest pins 35 and 36, alternately and preferably a single hinged rest plate 105 may be provided (Figure 8). This plate 105 is pivotally mounted on the lower hinged portion 8a of front plate 8. It is swingable from a position where the end of the rest plate extends across the chute 53 to immobilize a card at the projection position to a second position clear of chute 53 as shown. Mounted in fixed extended relationship with respect to hinged plate 105 is a pair of rest plate arms 106, of suitable length for the desired movement of plate 105. The extended end of each arm is connected in any suitable manner as by links 107 to the rest plate operating levers equivalent to rest pin levers 33 and 34 as shown in the drawing. In the second position, just before the extremity of travel of levers 33 and 34 is reached, a finger 108 projecting from plate 105 strikes against hinged portion 8a and causes both plate 105 and portion 8a to pivot together about the hinge of front portion 8a thereafter moving all parts mounted thereon away from chute 53. In this position, the chute is opened wide to permit an extremely bowed card, inadvertently admitted, to fall out to avoid jamming. At the same time projection lens 50 is lifted thereby cutting off light from the screen to avoid glare. Under the urge of return spring 109, front plate portion 8a is brought back against spacer bars 9 and 10.

As a further modification, rest plate 105 may form a shelf fixed on front plate portion 8a. Rest pin levers 33 and 34, acting through pins 35 and 36 suitably modified so as to be capable of pulling on plate 8a, may operate to not only accomplish periodic card release but to also temporarily open the chute wide and lift the lens 50 each time. In the absence of rest plate 105, it is clear that the rest pins 35 and 36 of the embodiment described and best shown in Figures 1 and 5 of the drawings may be modified so that as they are withdrawn to clear chute 53, they seize hinged plate portion 8a near the extremity of withdrawal, pulling it away to open up chute 53 wide and lift lens 50. In this further modification, rest pin cam 26 is changed to have a greater projection or at least a projecting lobe at least adjacent the trailing end of receding portion 102, which remains the same, so as to give levers 33 and 34 increased travel to pull plate 8a. However, in any embodiment or modification having a hinged lower front plate portion 8a, whether manually or automatically operated, there may be provided a return spring such as 109 for bringing the plate and its lens back into position aligned with the optical system. With a manually operated emergency chute opener a releasable spring clip may be employed to hold plate 8a shut.

While various specific parts have been enumerated and structural details have been described in the foregoing, it will be understood that certain changes and modifications may be made by those skilled in the art without departing from the scope and spirit of this invention. For example while a four-sided rectangular chute structure has been set forth, the chassis plate 3 and the front plate 8 as well as the spacer bars 9 and 10 may be eliminated without elimination of the necessary card chute space 53 except as they provide support for other members of the projector with desired spacing.

It is to be understood the foregoing is intended by way of illustration of a preferred embodiment and not as a limitation of the scope of the present invention except as set forth in the appended claims.

What I claim as my invention is:

1. A motor driven apparatus for automatically still projecting record card images in sequence at timed cycles for intervals of desired duration for study, identification, and the like comprising: means for projecting an enlargement of a record card borne image; means for guiding record cards to said projection means; magazine means for holding a supply of said cards in columnar array mounted adjacent one end of said guide means; magazine feed means for urging said array of cards toward said guide means so as to dispose the leading card of the array in alignment with said guide means; entry means mounted between said magazine and guide means for permitting passage of one lead card at a time from said array to said guide means; cut-off means mounted adjacent said entry means and means responsive to the position of said feed means for displacing said cut-off means in projecting entry-closing relationship with respect to the interior of said guide means for preventing passage of any card through said entry means whenever said magazine feed means is not operatively positioned for urging the card array toward said guide means; a first feed means for gradually initiating intermittent feed movement of immobile cards from said array one at a time through said entry means; a second feed means for completing the feed movement of said cards independently from said first means; detent means for releasably immobilizing the fed cards each in said guide means in alignment with said projection means; means for releasably clamping in projection position a card stopped in alignment with said projection means; drive transmission means connected to said motor for intermittently providing a dwell alternately with action comprising releasing said clamping means and detent means to enable discharge of a projected card from said guide means and thereafter in the same cycle actuating said first and second feed means to deliver a card to said guide means and finally actuating said detent means and clamping means to respectively immobilize and accurately position a card for projection during said dwell for an interval of time of relatively long duration as compared to the time of intermittent driving movement of said transmission means before commencement of the next cycle; coupling means between the driving end of said transmission means and said first and second means, detent means and clamping means, and control means manually operable at will for deactivating said drive transmission means to hold a projected image indefinitely for a time in excess of said dwell interval whenever further prolonged study of said image is desired.

2. The apparatus of claim 1 wherein the cut-off means is operatively coupled with both said magazine feed means and the control for the drive motor for preventing inadvertent passage of a lead card through said entry means and for simultaneously deactivating the drive motor whenever said magazine feed means is not operatively positioned for urging a card array toward said guide means.

3. The apparatus of claim 1 wherein the first feed means consists of a driven reciprocatable shuttle blade adapted to apply a thrust at a major portion of the trailing edge of the leading card of the columnar card array for only a portion of the card feed movement from the card magazine and wherein the second feed means comprises at least a pair of card puller pinch rolls at least one of which is driven and frictionally engages with the surface of said thrust mobilized leading card so as to complete the feed movement of said card independently from said first means.

4. The apparatus of claim 1 wherein the first feed means consists of a driven reciprocatable shuttle blade adapted to apply a thrust at a major portion of the trailing edge of the leading card of the columnar card array for only a minor portion of the card feed movement from the card magazine and wherein the second feed means comprises at least a pair of card puller pinch rolls at least one of which is driven and frictionally engages the surface of said thrust mobilized leading card so as to complete the major part of the feed movement of said cards independently from said first means.

5. The apparatus of claim 1 wherein the motor driven intermittent drive transmission comprises a Geneva mechanism of the type consisting of a Geneva star-cam with radially slotted arms and a Geneva gear driver wheel carrying a drive pin on a radial extension of the driver wheel and having a cut away portion to provide clearance for passage of the projecting slotted arms of the driven Geneva star-cam.

6. The apparatus of claim 1 wherein the first feed means consists of a driven reciprocatable shuttle blade adapted to apply a thrust at a major portion of the trailing edge of the leading card of the columnar card array and wherein the motor driven intermittent drive transmission comprises a Geneva mechanism of the type consisting of a Geneva star-cam with radially slotted arms and a Geneva gear driver wheel carrying a drive pin on a radial extension of the driver wheel and having a cut away portion to provide clearance for passage of the projecting slotted arms of the driven Geneva star-cam, and wherein said drive transmission is coupled to said first feed means by a slider-crank mechanism whereby the velocity characteristics of said Geneva and slider-crank mechanisms are compounded to move said leading card at the resultant low rate of acceleration imparted to said shuttle blade.

7. The apparatus of claim 1 wherein the card guide means is a chute and wherein the detent means comprises a flat surfaced member driven by the intermittent drive mechanism to retractably project into said chute for presentation of said flat surface in abutment with an edge of an oncoming fed card whereby the fed card is alternately releasably immobilized in said chute in alignment with the projection means and released after projection upon retraction of said member for discharge from said chute.

8. A motor driven apparatus for automatically still projecting record card images in sequence at timed cycles each for at least a desired minimum interval of duration for image study, identification and the like comprising: means for projecting an enlargement of a record card borne image; a chute for guiding the record cards to the projection position of said projection means; magazine means mounted adjacent one end of said chute for holding a supply of said cards in columnar array in perpendicularity with said guide chute at the entry end thereof; a spring biased magazine feed toggle arm mounted adjacent said magazine for yieldably pressing said array of cards toward said guide chute so as to dispose the leading card of the array in alignment with said guide chute; a fixed card monitoring gate consisting of spaced gate members positioned adjacent the discharge end of said magazine for permitting passage of one lead card at a time between said gate members from said array to said card guide chute; a retractible chute closure means adjacent said fixed card gate members and operatively coupled with said magazine feed toggle arm so as to be projectable between said array and the entry end of the chute for preventing inadvertent entry of a lead card into said card monitoring gate whenever said magazine feed toggle arm is retracted for reloading of the magazine and is not operatively positioned for pressing the card array toward said guide chute; a driven reciprocatable shuttle blade adapted for gradually initiating intermittent feed movement of said card monitoring gate by a thrust applied at a major portion of an edge of the leading card; driven card puller pinch rolls for frictionally engaging with said thrust mobilized leading card and completing the major part of the feed movement of said card independently from said blade; driven card rest means adapted for presenting a flat abutting surface to an edge of an oncoming fed card for releasably immobilizing the fed cards one at a time at the projection position in said chute with the card image in alignment with said projection means; a driven open ended pressure pad having an optical orifice aligned with the axis of said projection means and having at least an edge adapted to surround the image of a card stopped in alignment with said projection means for releasably applying at said edge clamping pressure about the card borne image to hold it in projection position; an intermittent drive transmission connected to said motor of the Geneva type for providing a dwell alternately with a cyclic motion for sequentially releasing said pressure pad and card rest means to discharge a projected card from said projection position and thereafter in the same cycle actuating the shuttle blade and card puller to deliver another card to said chute and finally in the same cycle actuating said card rest means and pressure pad sequentially to respectively immobilize and accurately position the delivered card at said projection position for projection during said dwell and coupling means between the driving end of said transmission and said driven blade, rolls, card rest means and pad.

9. The apparatus of claim 8 wherein the duration of dwell is relatively long compared to the time interval of cyclic motion.

10. The apparatus of claim 8 including control means manually operable at will for deenergizing said drive transmission, for holding a projected image for a time in excess of the duration of dwell whenever further prolonged study of said projected image is desired.

11. The apparatus of claim 8 wherein the shuttle blade moves the card for only a minor portion of its travel from the magazine to the projection position and wherein the pinch rolls move the card for a major portion of said travel.

12. In apparatus to project an enlargement of transparencies in sequence from a columnar array of a plurality of such transparencies having a projection optical system including a projection position, an illumination means including a lamp, a main drive motor and cooling means including a motor driven fan, the improvement of an automatic transparency changing unit comprising a horizontally extending magazine for said array having a reloading end and a lateral throat at the other end, a vertical guideway mounted adjacent said magazine and having one end at said throat adapted to admit not more than one transparency at a time to said guideway, said guideway having a stationary light aperture and a second light aperture spaced from said stationary aperture, and being movable toward and from said stationary aperture, said apertures embracing said projection position and being flat glass platens disposed on opposite sides of said projection position in said guideway, a first motor driven transfer means adjacent said throat to pick a transparency at a time from said magazine and push it with low acceleration through said throat to extend into said guideway and second motor driven transfer means for pulling said transparency away from said first means and for impelling it to the projection position, retractable stop means mounted on said guideway adjacent said apertures in projectable relationship with said guideway for immobilizing the transparency in registery with said apertures, means for coupling said main motor to said first and second transfer means, said coupling means including means motor driven in synchronism with both of said transfer means for governing the movement of said second aperture and said stop means to clamp said transparency between said platens after it has been immobilized and thereafter to release the transparency after projection in preparation for arrival of the next transparency at said projection position.

13. The apparatus of claim 12 wherein the first transfer means is reciprocatingly driven with an intermittent motion compounded of a Geneva motion and the motion of the slider of a slider-crank mechanism and wherein the second transfer means includes pinch rolls driven intermittently at higher peripheral velocity than said first transfer means at the moment of delivery of the transparency to said second means.

14. The apparatus of claim 12 wherein the first transfer means moves the transparency for only a minor portion of its travel from the magazine to the projection position and wherein the second transfer means moves the transparency for a major portion of said travel.

15. The apparatus of claim 12 including an intermittent motion mechanism coupled to a slider crank mechanism for holding the transparency at the projection position with a desired duration of dwell relatively long as compared to the time of movement of said transparency to said projection position.

16. The apparatus of claim 12 including an electric motor for operating the transfer means, second aperture and stop means and a manually operable electric switch for energizing said motor to put the transparency changing unit into operation including said dwell period and for deenergizing said motor to hold the transparency beyond the dwell period at will.

17. In a picture projector having a projection optical system including a lamp and a projection position, a power-operated automatic picture changing unit comprising magazine means for holding a stack of to-be-projected pictures, a storage compartment for successively receiving projected pictures, means mounted to extend from adjacent said magazine to adjacent said compartment for guiding said pictures athwart said optical system from said magazine means to said storage compartment, said guide means also including said projection position, throat means for permitting only one picture at a time to enter said guide means, means for picking one picture at a time in succession from said stack and starting it through said throat means, means for urging said stack in the magazine toward said throat and picking means, means for thereafter continuing the movement of said picture through said throat to the projection position, means for stopping said picture at the projection position, means for pressing said picture into planarity and accurate position thereat for projection, coupling means connected to said picking, movement continuing, stop and pressing means for driving them in synchronism, and an intermittent motion mechanism connected to said coupling means for driving said picker means, movement continuing means, stop means and pressing means with desired gradual acceleration and deceleration with a dwell of sufficient duration between drive intervals to permit study of the projected picture.

18. In a projector for reading information carrying cards and the like, a card handling apparatus comprising in combination a relatively close fitting card guide means having an inlet end a discharge end and a card projection station intermediate said ends, a card magazine mounted adjacent said inlet end, means mounted adjacent said magazine and guide means for picking immobile cards one-at-a-time in succession from said magazine and putting each into motion into said guide means initially with low acceleration, feed means mounted adjacent said guide and picking means for continuing the major part of the motion of said mobilized card sufficiently to impel it to said projection station free from said picker means, means mounted adjacent said guideway in projectable relationship thereinto for arresting said card at said projection station, means for clamping at least a portion of an immobilized card at said projection station in desired position, coupling means for releasing said card clamping and arresting means successively and after a dwell period for effectuating card picking, feeding, arresting and clamping action successively, means also connected to said coupling means for positively clearing said guide means adjacent said projection station and said discharge end, and intermittent drive means connected to said coupling means for energizing said card picker, feed, arresting, clamping, releasing and clearing means at periodic intervals spaced by said dwell period during which the information of said card is projected for reading.

19. The apparatus of claim 18 wherein the clearing means is a hinged front portion of the guide means and carries a portion of the optical systems whereby the image of the light source of the projector is also cut off between successive card projections.

References Cited in the file of this patent

UNITED STATES PATENTS

| | | |
|---|---|---|
| 1,093,401 | Gottlieb | Apr. 14, 1914 |
| 1,387,294 | Mosure | Aug. 9, 1921 |
| 1,407,646 | Dunlany | Feb. 21, 1922 |
| 2,016,711 | Ford | Oct. 8, 1935 |
| 2,021,648 | Dickermann et al. | Nov. 19, 1935 |
| 2,223,334 | Robison | Nov. 26, 1940 |
| 2,353,888 | Fuge | July 18, 1944 |
| 2,696,688 | Helgeson | Dec. 14, 1954 |
| 2,705,437 | Lessman | Apr. 5, 1955 |
| 2,734,743 | Spurlino et al. | Feb. 14, 1956 |